US006942751B1

(12) United States Patent
George

(10) Patent No.: US 6,942,751 B1
(45) Date of Patent: Sep. 13, 2005

(54) METHOD AND APPARATUS FOR THERMOFORMING OF PLASTIC SHEETS

(75) Inventor: Richard Warrington George, Worcestershire (GB)

(73) Assignee: Permacoat Limited, Worcestershire (GB)

( * ) Notice: Subject to any disclaimer, the term of this patent is extended or adjusted under 35 U.S.C. 154(b) by 407 days.

(21) Appl. No.: 10/129,231

(22) PCT Filed: Oct. 20, 2000

(86) PCT No.: PCT/GB00/04041

§ 371 (c)(1),
(2), (4) Date: May 2, 2002

(87) PCT Pub. No.: WO01/32400

PCT Pub. Date: May 10, 2001

(30) Foreign Application Priority Data

| Nov. 2, 1999 | (GB) | 9925816 |
| Dec. 8, 1999 | (GB) | 9928869 |
| May 17, 2000 | (GB) | 0011766 |

(51) Int. Cl.[7] ............................................. B32B 9/00
(52) U.S. Cl. .................. 156/286; 156/285; 156/382
(58) Field of Search ........................ 156/285, 286, 156/382, 583.3; 100/296, 211; 261/510, 261/553, 571

(56) References Cited

U.S. PATENT DOCUMENTS

| 3,322,601 A | * | 5/1967 | Wong et al. ................. 156/499 |
| 3,383,265 A | * | 5/1968 | Garabedian ............... 156/273.7 |
| 3,964,958 A | * | 6/1976 | Johnston ..................... 156/382 |
| 4,127,436 A | * | 11/1978 | Friel ........................... 430/315 |
| 4,152,188 A | * | 5/1979 | Friedrich et al. ........... 156/212 |
| 4,366,663 A | | 1/1983 | Grebe |
| 5,387,452 A | | 2/1995 | Addeo et al. |
| 6,041,840 A | | 3/2000 | Ogawa |

FOREIGN PATENT DOCUMENTS

| DE | 3706443 A | 9/1988 |
| EP | 0302703 A | 2/1989 |
| EP | 0 339 275 | 11/1989 |
| JP | 54-132675 | 10/1979 |
| JP | 62-270319 | 11/1987 |
| JP | 3-150126 | 1/1991 |
| JP | 4-14434 | 1/1992 |
| JP | 63-214424 | 9/1998 |
| JP | 10-315257 | 12/1998 |
| WO | WO 99/25515 | 5/1999 |

* cited by examiner

Primary Examiner—Sam Chuan Yao
Assistant Examiner—B J Musser
(74) Attorney, Agent, or Firm—Young & Thompson

(57) ABSTRACT

A method of forming plastics sheets, comprises the steps of supporting a die (or substrate 12) between plastics sheets 36 in an enclosure, heating the plastics sheets 36 by infra-red heating element 28, evacuating air from the enclosure, and urging the plastics sheets 36 into contact with opposite faces of the die (or substrate 12) while maintaining a vacuum or a substantial vacuum between the plastics sheets 36. Apparatus for performing this method is also disclosed.

19 Claims, 3 Drawing Sheets

METHOD AND APPARATUS FOR THERMOFORMING OF PLASTIC SHEETS

Figure 1:
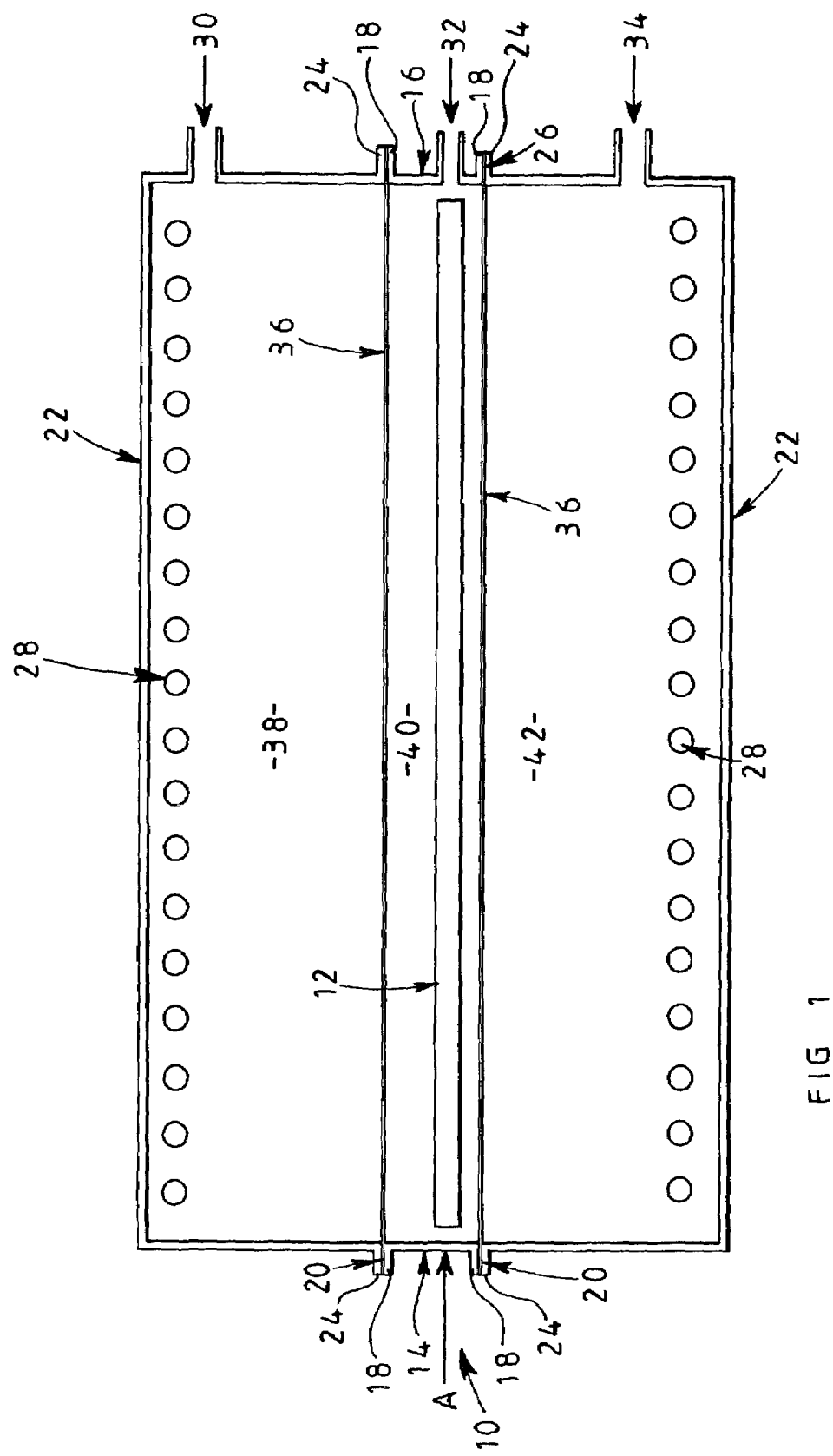

This invention relates to a method of and apparatus for forming plastics sheets and more particularly, but not exclusively, for forming and bonding plastics sheets onto opposite faces of a substrate.

According to a first aspect of the present invention, there is provided a method of forming plastics sheets, the method comprising the steps of:

(a) supporting a die (or substrate) between and in spaced relationship to plastics sheets in an enclosure, (b) evacuating air from the enclosure, and (c) urging the plastics sheets into contact with opposite faces of the die (or substrate) while maintaining a vacuum or a substantial vacuum between the plastics sheets.

Preferably, the plastics sheets when supported in the enclosure separate the enclosure into three chambers, one of which is between the plastics sheets and the other two of which are vented to atmosphere to urge the plastics sheets into contact with opposite faces of the die (or substrate). In this case, the said other two chambers may be pressurised during the final stage of the forming operation.

Preferably, the method further comprises the step of heating the plastics sheets to an elevated temperature before step (c). In this case, the plastics sheets may be heated above their softening point. Advantageously, the plastics sheets may be heated by heating means within the vessel. The heating means may be infra-red heating means or heating platens.

In one embodiment, membranes are heated by the heating means and the heated membranes transfer heat to the plastics sheets and urge the plastics sheets into contact with opposite faces of the die (or substrate). In this case, the plastics sheets and membranes may separate the enclosure into five chambers.

Preferably, the method is for forming and bonding plastics sheets onto opposite faces of a substrate, and comprises steps (a), (b) and (c) as set out above and additionally a step of coating the substrate and/or plastics sheets with adhesive prior to step (b).

According to a second aspect of the invention, there is provided apparatus for forming plastics sheets or forming and bonding plastics sheets onto opposite faces of a substrate, the apparatus comprising a housing, means for supporting a die (or substrate) in the housing, means for supporting the plastics sheets in spaced relationship about the housing, separable covers sealable to the housing, heating means for heating the plastics sheets, and means for evacuating or substantially evacuating air from an enclosure formed when the covers are sealed to the housing.

Preferably, each of the covers has a peripheral seal associated therewith for trapping one of the sheets of plastics between the housing and the corresponding cover, such that the plastics sheets separate the enclosure into first, second and third chambers. In this case, the air evacuation means is for selectively evacuating the first, second and third chambers.

The apparatus may further comprise means for supporting a membrane between the heating means and each plastics sheet such that in use the plastics sheets and membranes separate the enclosure into five chambers. In this case, the air evacuation means may be for selectively evacuating the five chambers.

Preferably, the apparatus may comprise a moving mechanism that moves the die (or substrate) into the housing.

Preferably, the heating means, typically infra-red heating means, is disposed in each of the covers. However, alternatively, the heating means may be separate of the covers.

Figure 2A:
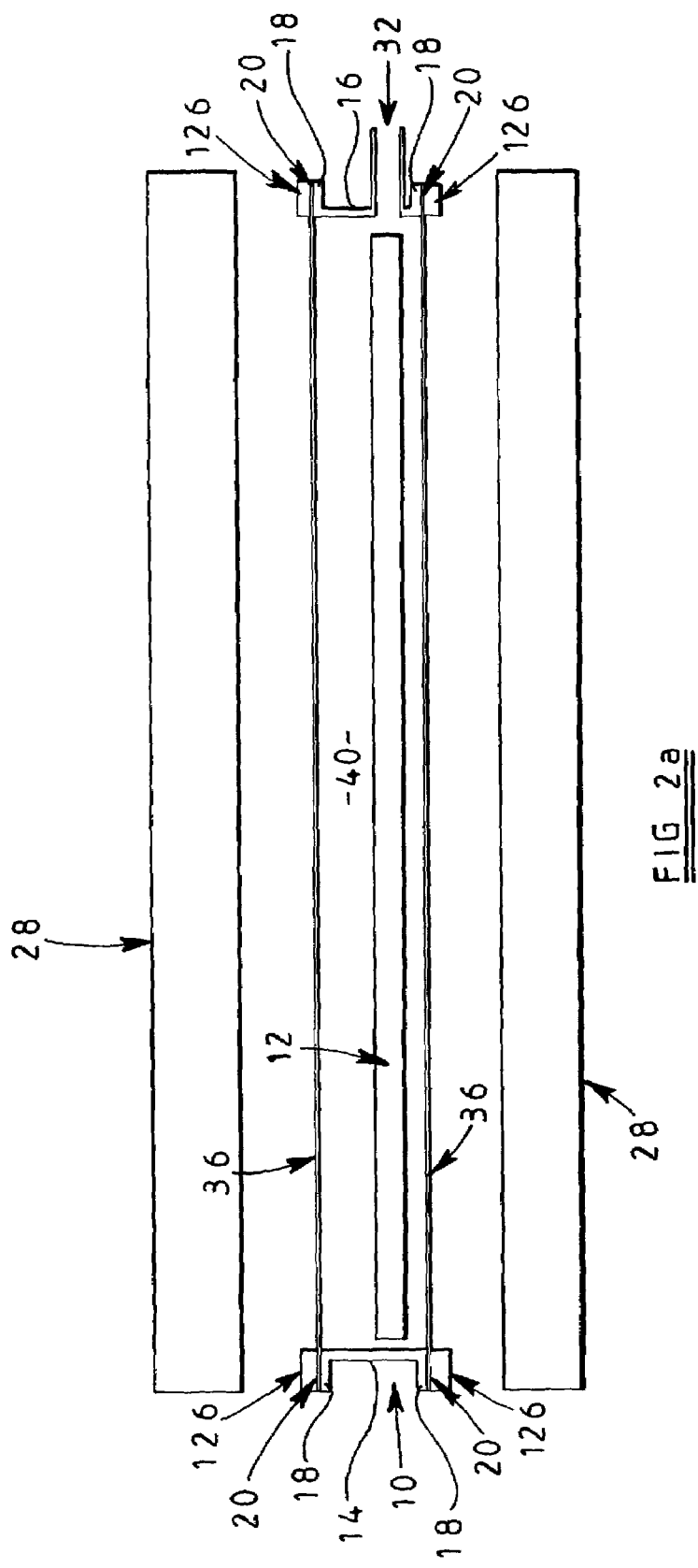
Figure 2B:
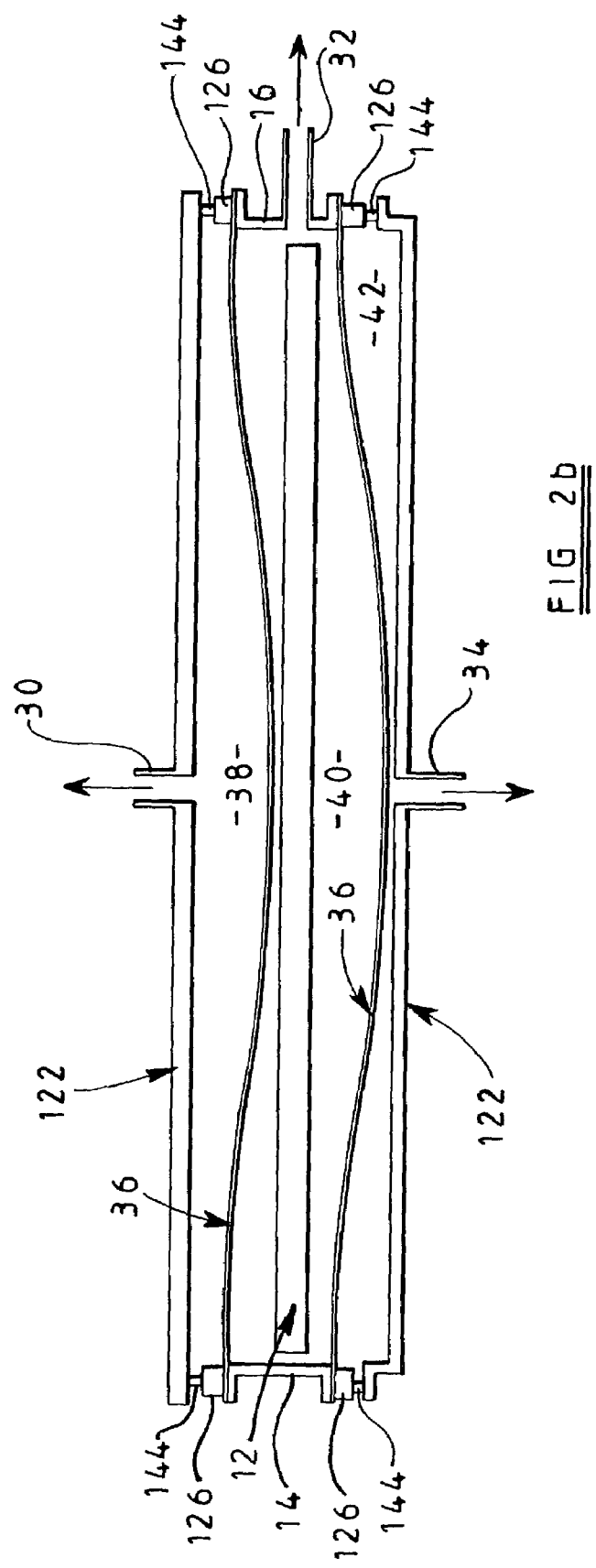

The invention will now be more particularly described, by way of example, with reference to the accompanying drawings, in which:

FIG. 1 is a vertical section through a first embodiment of apparatus for forming two plastics sheets or for forming and bonding two plastics sheets onto a substrate, in accordance with the second aspect of the invention, and FIGS. 2a and 2b are vertical sections through a second embodiment of the apparatus, in accordance with the second aspect of the invention.

Referring to FIG. 1, the apparatus shown therein comprises a substrate housing 10 into which a substrate 12 is longitudinally insertable in direction A and releasably fixable in the lateral direction.

End channels 14 and 16 of the substrate housing 10 are releasably attachable in an airtight manner.

Outwardly projecting flanges 18, which support airtight seals 20, are provided flush at open upper and lower ends of the substrate housing 10.

Covers 22 are releasably mountable in aligned relationship on the substrate housing 10. Flanges 24 supporting airtight seals 26, which correspond to flanges 18 and seals 20, are provided at the open ends of the covers 22. In this way, an airtight enclosure is producible around the substrate 12. Infra-red heaters 28 are provided in each of the covers 22.

Three ports 30, 32 and 34 for evacuating air from within the vessel are also provided. The port 30 is connected to the upper cover 22 at a position above the flange 24. The port 32 is connected to the end channel 16 of the substrate housing 10 between the flanges 18 and at a position substantially coplanar with the substrate 12 when inserted. The port 34 is connected to the lower cover 22 at a position below the flange 24.

In use, the substrate 12, typically a timber product, is coated with adhesive, typically a heat activated dry film type adhesive, on upper and lower surfaces before being slid, possibly on a retractable conveyor, into the substrate housing 10. The substrate 12 is then typically clamped in place at separated side-wall members (not shown), and end channels 14 and 16 of the substrate housing 10 are releasably attached between the side-wall members, such that an airtight seal is formed. A plastics sheet 36, typically PVC, ABS or other thermoplastics material, is placed on each of the seals 20, and the covers 22 are then positioned on each of the plastics sheets 36 so that the seals 26 sealingly engage the plastics sheets 36. The upper and lower covers 22 are then clamped in position to the substrate housing 10. The substrate is in spaced relationship to the plastics sheets. An airtight seal is thus created by the plastics sheets 36 interposed between the seals 20 and 26 supported by the flanges 18 and 24, and an enclosure comprising first, second and third chambers 38, 40 and 42 is formed. Obviously, the facing surfaces of the plastics sheets 36 may be coated with the adhesive instead of, or in addition to, the coating of the substrate 12.

The chambers 38, 40 and 42 are then evacuated via ports 30, 32 and 34, respectively, to at least 920 millibars absolute vacuum and ideally to 970–980 millibars for permeable substrates and 990 millibars plus for non-permeable substrates. Once the required vacuum level has been achieved, the heaters 28 are activated to heat the plastics sheets 36 to above their softening temperature (typically being a temperature of 110° C. to 170° C.). On reaching the required temperature, the heaters 28 are switched off and air is then admitted through ports 30 and 34 to chambers 38 and 42, while chamber 40 is maintained in an evacuated state. The admitted air forces the heated plastics sheets 36 into intimate contact with the upper and lower adhesive coated surfaces of the substrate 12. The heated plastics sheets 36 activate the heat sensitive adhesive and a bond is formed between the substrate 12 and each of the sheets 36. The vacuum is maintained in the chamber 40 until the plastics sheets 36 are sufficiently stiff and the bonds sufficiently strong to allow handling. At this stage, the chamber 40 is vented to the atmosphere, and the covers 22 can be retracted to allow cooling. The skinned substrate can then be removed and edge trimmed.

In practice, the plastics sheets 36 may sag when heated. If this is excessive the lower sheet may come into contact with the lower heater 28 causing it to melt and the upper sheet may come into contact with the substrate prematurely causing a cold spot and poor forming. To overcome this the sheet sag may be monitored using through scan type "magic eyes". When the sag becomes excessive the relative pressures in the chambers 38, 40 and 42 may be adjusted to lift the relevant sheet using differential air pressure.

In a modification, the infra-red heaters 28 can be replaced with heating platens. In this case, chambers 38 and 42 will be evacuated via ports 30 and 34, drawing plastics sheets 36 into direct contact with the heating platens. Once the plastics sheets 36 reach the required temperature, the heating platens will be switched off and air admitted through ports 30 and 34 into chambers 38 and 42 after air has been evacuated through port 32 from chamber 40. In this way, similar intimate contact and bonding is achieved between the plastics sheets 36 and the substrate 12.

In a further modification, a membrane (not shown) may be interposed between each infra-red heater 28 or heating platen and plastics sheet 36. In this case, an extra venting port (not shown) will be appropriately disposed to evacuate or admit air from the chamber created between each membrane and plastics sheet 36. The membranes, instead of the plastics sheets 36, will be heated by the infra-red heaters 28 or heating platens as previously described. Once the heaters are switched off, air is evacuated between the membranes and the plastics sheets and air is readmitted to chambers 38 and 42, allowing the membranes to contact the plastics sheets 36, thus heating them. Hot air may also be circulated in chambers 38 and 42 and/or the infra-red heaters 28 may be activated at this time if necessary. Air is then evacuated from chamber 40 through its port 32 and optionally from chambers 38 and 42, again if necessary. Once chamber 40 is sufficiently evacuated, chambers 38 and 42 are vented to atmosphere or even positively pressurised, causing the membranes to force the plastics sheets 36 into intimate contact and bonding with the substrate 12.

In this above-described modification, the membranes are separated from the plastics sheets 36 by positively pressurising, via the respective ports, the chambers created between the membranes and the plastics sheets 36.

Additionally or alternatively, the membranes may be heated by hot oil, water or electrical heating elements incorporated within the membranes.

In a second embodiment of the present invention, like numerals refer to like parts. To enable an increase in productivity, the substrate 12 may be mounted in the substrate housing 10 at a first loading location, and the end channels 14 and 16 may be fitted at a second fitting location. The infra-red heaters 28 need not necessarily be mounted in the covers 22. With reference to FIGS. 2a and 2b, the heaters 28 may be positionable about the substrate housing 10 containing the substrate 12 so that the plastics sheets 36, held in place by clampable seals 126, are heated to the desired temperature. If the substrate housing 10 is also holding the membranes, as previously described, then these will also be heated to a desired temperature along with the plastics sheets 36. The substrate housing 10 is then positioned with respect to covers 122. The covers 122 are airtightly sealed by auxiliary seals 144 to the substrate housing 10 and evacuation commences, similarly to the first embodiment. On completion of the forming and bonding of the plastics sheets 36 to the substrate 12, the covers 122 can be removed and the substrate housing 10 moved to a location for cooling. The skinned substrate can be removed at a final unloading location.

In a modification to the second embodiment, it may be desirable that the substrate housing 10 containing the mounted substrate 12 remain stationary while the peripheral components are successively positioned relative thereto.

In a further modification to the above, it may be desirable to pressurise the upper and lower chambers 38 and 42, typically with air at a pressure of 5 to 300 psi, during the final stage of the forming and bonding operation.

With the apparatus described above, when not using membranes it is possible to form and bond plastics sheets having a thickness typically in the range of 0.4 to 3.0 millimeters to a substrate thus providing strong crack resistant facings on the substrate. When using membranes, it is possible to form and bond sheets having a thickness typically in the range of 0.2 mm to 0.5 mm.

Typically, the apparatus described above can be used to form and bond plastics sheets to a shaped substrate, such as a door. In addition to timber, the substrate may be formed from a suitable foam, rubber, plastic, metal or any combination thereof.

The above method can also be used to simultaneously form two plastics sheets into a desired shape. In this case, the substrate simply acts as a die and no adhesive is applied to the plastics sheets or substrate.

The embodiments described above are given by way of example only and various modifications will be apparent to persons skilled in the art without departing from the scope of the invention as defined in the appended claims.

What is claimed is:

1. A method of forming plastics sheets, the method comprising the steps of:
   (a) supporting a substrate between and in spaced relationship to plastics sheets held by a housing,
   (b) sealably attaching covers to opposite sides of the housing to form an enclosure,
   (c) evacuating air from the enclosure,
   (d) heating the plastics sheets to an elevated temperature, and
   (e) urging the plastics sheets into contact with entire opposite faces of the substrate while maintaining a vacuum or a substantial vacuum between the plastics sheets to bond the plastics sheets to the substrate.

2. A method as claimed in claim 1, wherein the plastics sheets separate the enclosure into three chambers, one of which is between the plastics sheets and the other two of which are vented to the atmosphere to urge the plastics sheets into contact with opposite faces of the substrate.

3. A method as claimed in claim 2, wherein the said other two chambers are pressurised during the final stage of the forming operation.

4. A method as claimed in claim 1, wherein the plastics sheets are heated above their softening point.

5. A method as claimed in claim 1, wherein the plastics sheets are heated by heating means within the enclosure.

6. A method as claimed in claim 5, wherein the heating means is infra-red heating means.

7. A method as claimed in claim 5, wherein the heating means comprises two heating platens.

8. A method as claimed in claim 5, wherein membranes are heated by the heating means and the heated membranes transfer heat to the plastics sheets and urge the plastics sheets into contact with opposite faces of the substrate.

9. A method as claimed in claim 8, wherein the plastics sheets and membranes separate the enclosure into five chambers.

10. Apparatus for forming plastics sheets or forming and bonding plastics sheets onto a substrate, the apparatus comprising a housing, means for supporting a substrate in the housing, means for supporting the plastics sheets in spaced relationship about the housing, separable covers sealable to the housing, heating means for heating the plastics sheets, and means for evacuating or substantially evacuating air from an enclosure formed when the covers are sealed to the housing, wherein, in use, the plastics sheets are urged into contact with entire opposite faces of said substrate.

11. Apparatus as claimed in claim 10, wherein each of the covers has a peripheral seal associated therewith for trapping one of the sheets of plastics between the housing and the corresponding cover, such that the plastics sheets separate the enclosure into first, second and third chambers.

12. Apparatus as claimed in claim 10, further comprising means for supporting a membrane between the heating means and each plastics sheet such that in use the plastics sheets and membranes separate the enclosure into five chambers.

13. Apparatus as claimed in claim 12, wherein the air evacuation means is for selectively evacuating the five chambers.

14. Apparatus as claimed in claim 10, further comprising a moving mechanism for moving the substrate into the housing.

15. Apparatus as claimed in claim 10, wherein the heating means are disposed in each of the covers.

16. Apparatus as claimed in claim 10, wherein the heating means are separate of the covers.

17. Apparatus as claimed in claim 10, wherein the heating means is infra-red heating means.

18. Apparatus as claimed in claim 10, wherein the heating means comprises heating platens.

19. A method of forming and bonding plastics sheets onto opposite faces of a substrate, comprising the steps of:
   (a) supporting a substrate between and in spaced relationship to plastics sheets held by a housing, wherein at least one of the substrate and plastics sheets is coated with adhesive,
   (b) sealably attaching covers to opposite sides of the housing to form an enclosure,
   (c) evacuating air from the enclosure,
   (d) heating the plastics sheets to an elevated temperature, and
   (e) urging the plastics sheets into contact with entire opposite faces of the substrate while maintaining a vacuum or a substantial vacuum between the plastics sheets to bond the plastics sheets to the substrate.

* * * * *